Figure 1:
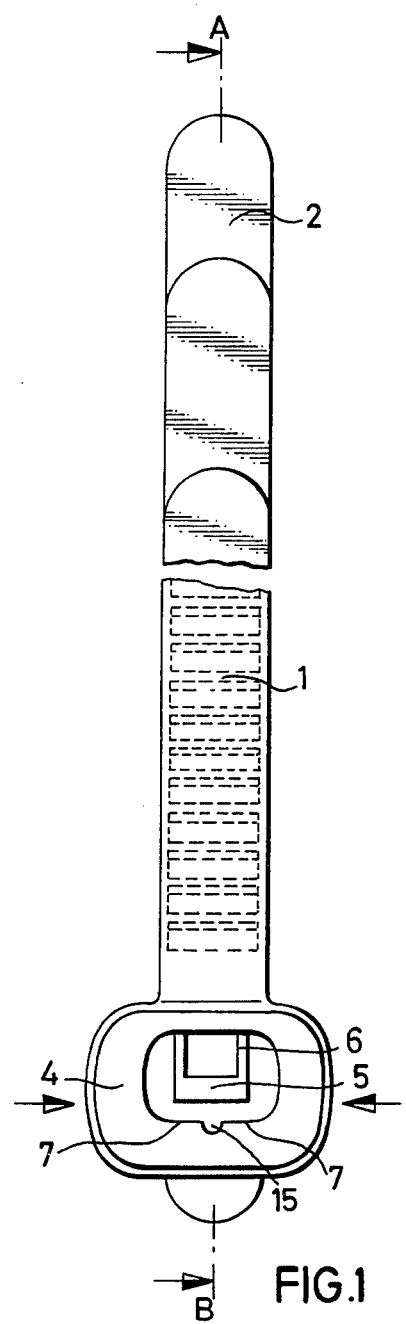

United States Patent [19]

Seil

[11] 4,011,633

[45] Mar. 15, 1977

[54] CABLE BAND

[75] Inventor: Jürgen Seil, Norderstedt, Germany

[73] Assignee: ITW-Ateco G.m.b.H., Norderstedt, Germany

[22] Filed: Nov. 5, 1975

[21] Appl. No.: 629,175

[30] Foreign Application Priority Data

Nov. 29, 1974 Germany .......................... 2456486

[52] U.S. Cl. ............................................. 24/16 PB
[51] Int. Cl.² ......................................... B65D 63/00
[58] Field of Search .................................. 24/16 PB

[56] References Cited

UNITED STATES PATENTS

| 2,979,794 | 4/1961 | Bartolo | 24/16 PB |
| 3,224,056 | 12/1965 | Joffe | 24/16 PB |
| 3,463,427 | 8/1969 | Fisher | 24/16 PB |
| 3,484,905 | 12/1969 | Eberhardt | 24/16 PB |
| 3,588,962 | 3/1970 | Feldberg | 24/16 PB |
| 3,653,096 | 4/1972 | Fernberg | 24/16 PB |
| 3,735,449 | 5/1973 | Rosales | 24/16 PB |
| 3,739,429 | 6/1973 | Kohke | 24/16 PB |
| 3,924,299 | 12/1975 | McCormick | 24/16 PB |
| D224,960 | 10/1972 | Wilson | 24/16 PB |

FOREIGN PATENTS OR APPLICATIONS

| 1,288,128 | 2/1963 | France | 24/16 PB |
| 1,221,829 | 2/1971 | United Kingdom | 24/16 PB |

Primary Examiner—Bernard A. Gelak
Attorney, Agent, or Firm—Jack R. Halvorsen; Robert W. Beart

[57] ABSTRACT

This invention relates to a one-piece plastic cable strap having a toothed band and a plug-in type socket at one end thereof. The socket consists of an elastically deformable frame having a generally oval shape forming a funnel-shaped opening. An interlocking latch projects into the opening for engagement with the toothed band as the band is fed into the opening; the oval frame is capable of being compressed in the direction of the longitudinal axis to increase the dimension of the minor axis so as to unlock the band from the latch. The latch further includes a pair of skin-like portions connecting the side edges with the support side of the frame to provide a resilient spring-like action to the latch with the engaging end of the latch being spaced from the end of the opening a distance at least equal to the spacing of adjacent teeth on the band.

2 Claims, 3 Drawing Figures

CABLE BAND

The present invention involves a one-piece cable band of flexible plastics material having a toothed band and a plug-in type socket at the one end thereof, said socket comprising an elastically shapable frame with a funnel-shaped opening to receive the toothed band while interlocking the toothed band at the plug-in type socket by engaging a locking portion at the teeth of the toothed band, said interlocking engagement being releasable again through elastic deformation of the frame.

It has already become known to produce cable bands adapted to be opened again through elastic deformation. The German Pat. No. 1,640,526 shows a cable band of flexible plastics material comprising a plug-in type socket and a toothed band formed integrally therewith in one piece. To close the cable band the toothed band is introduced into the funnel-shaped opening of the plug-in type socket which narrows to form a gap. The toothed band is pulled through the gap with the teeth of the band coming into engagement with two detents adjacent the gap. To open the plug-in type socket it is elastically deformed in a direction longitudinally of the opening thereof by compression with the detents adjacent the gap releasing the teeth of the cable band, so that the band may be pulled out of the plug-in type socket.

The arrangement of the teeth of the toothed band and the detents in this embodiment has been found to be capable of improvement. When cutting off the surplus cable end it may easily happen that the cut is performed at too short a distance above the detents of the plug-in type socket so that the teeth of the band which are just being in engagement with the detents are too much weakened and will deflect when subjected to a load. Also the detents defining the gap have a tendency to deflect because they are unable to withstand any major tensile load by virtue of their arrangement. In both cases the plug-in type socket will no longer be able to retain the toothed band so that the connection may inadvertently become released.

It is therefore the object of the invention to provide a cable band adapted to be readily opened through elastic deformation and which, after the surplus end of the band has been cut off, will safely retain the band in the plug-in type socket. The problem is solved in that the interlocking portion is formed by a hook-shaped interlocking latch on the side of the frame facing towards the toothed band, which extends obliquely from the end of introduction towards the opposite side of the frame and into the opening.

Preferably the interlocking latch projects into the region of the frame to receive the toothed band in such a manner that a tensional force acting opposite to the direction of closing on the toothed band tightly clamps the toothed band with the interlocking latch which is in engagement with a tooth of the band, and with the oppositely disposed side of the frame.

It may also be found advantageous to provide several such interlocking latches with the cable band being toothed on the corresponding sides of its polygonal cross section. In this connection it is particularly advantageous if two such interlocking latches are disposed one opposite the other. It may, however, also be imagined to provide two pairs of oppositely disposed interlocking latches with the teeth of the cable band having of course to be arranged correspondingly.

Another embodiment is provided in that the frame is designed to be oval and the longitudinal axis of the opening is longer by so much than the toothed band is wide that the frame is capable of being compressed in the direction of the longitudinal axis in order to unlock the toothed band. In an advantageous embodiment the thus shaped plug-in type socket may be opened again simply by elastic deformation.

In another embodiment of the invention the wall of the opening opposite the interlocking latch is provided with a groove extending approximately in parallel with the axis of the opening, preferably a round groove. An abutment surface designed in this manner facilitates the elastic deformation thus reducing the pressure which has to be applied to open the plug-in type socket.

In another embodiment of the invention the interlocking latch is connected with the side of the frame facing towards the toothed band by at least one skin-like portion. With a tensile load exerted on the toothed band through the cables to be retained the skin-like portion is sufficiently elastic to enable a clamping effect between the latch and the abutment area of the frame member but will prevent a complete deflection of the latch thus preventing the toothed band from slipping through.

Another embodiment of the invention is distinguished by the interlocking latch terminating by a predetermined distance, preferably by at least one tooth length, in front of the outlet end of the opening. When cutting off the surplus end of the toothed band, now, the tooth remaining on the band advantageously always is still so strong that it cannot deflect. The cutting point may without hesitation be placed directly above the edge of the plug-in type socket which defines the exit opening for the surplus end of the cable band. Even if the cable band is used in places which are accessible only with difficulty, for instance, in the motor rooms of automotive vehicles, this cut may be performed without fearing that the closure might be weakened. Besides, an end projecting from the plug-in type socket may be completely eliminated.

Figure 2:
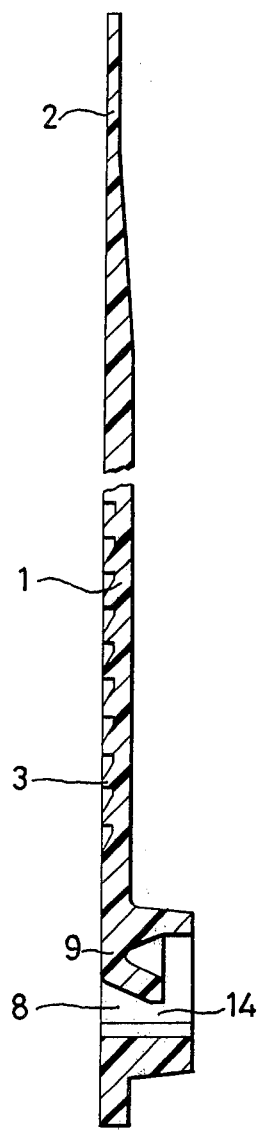
Figure 3:
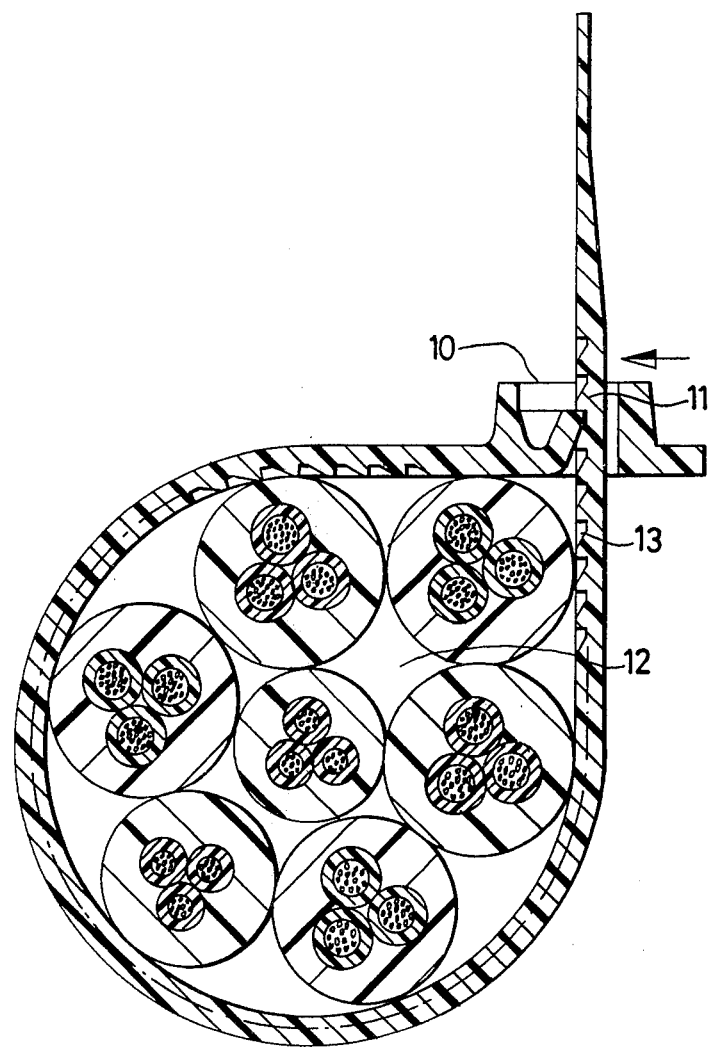

In the following, an embodiment of the invention will be explained in more detail by way of the drawings. In the drawings, FIG. 1 shows a top plan view of a cable band according to the invention;

FIG. 2 shows a longitudinal sectional view of the cable band taken along line A—B of FIG. 1; and FIG. 3 shows a sectional view of a closed cable band.

FIG. 1 shows a cable band 1 having an oval frame 4 formed integrally with the cable band at one end thereof, said frame comprising an oval opening into which there extends obliquely from the end of introduction a hook-shaped interlocking latch 5, said latch extending from the side of the frame 4 facing towards the toothed band to the opposite side. The interlocking latch 5 is of approximately uniform rectangular cross section over its length and is of a length slightly shorter than the width of the toothed band and substantially shorter than the longitudinal axis of the opening. The frame 4 forms with the interlocking latch a funnel-shaped opening 8 (FIG. 2) for the introduction of the free end 2 of the band 1 which, to facilitate the introduction into the funnel-shaped opening 8, is a tapered structure in the region designated at 2. The toothed band is provided with teeth 3 on the side facing towards the latch 5 when in use, said teeth being adapted to be brought into engagement with the latch 5 (FIG. 3). The latch 5 is supported on either side by means of an elastic skin-like portion of connection 6 which extends as far as the free end of the latch 5, and is connected with the frame 4 by an elastic web 9. The upper free end of the latch 5, as shown in FIG. 1, is countersunk into the frame 4 by approximately the basis length of a tooth 3. To close the cable band the free end 2 is looped around the bunch of cables 12 to be retained and introduced into the funnel-shaped opening 8 of the frame 4, and pushed through. The end 2 projecting from the other side is seized and tightened so that the band 1 slides through the plug-in type socket. When pulling through the relatively slightly upwardly sloping surfaces 13 of the teeth 3 will deflect the latch 5 like a ratchet because the web 9 is elastic. If the cable bunch 12 is strongly looped, the cable band is placed unto the latch 5 by means of the next tooth 3 in such a manner that the elastic band is subjected to a tension. This tensile stress tends to pull the band out of the plug-in type socket thus pulling the latch into the slot 14 formed between the abutment surface 7 and the upper end of the latch 5, because the latch 5 is in engagement with a tooth 3. In this manner, the band is additionally clamped and safely retained. The portions of connection 6 prevent the latch from deflecting and sliding through. The surplus end of the band 1 may now be severed in the direction as indicated by the arrow in FIG. 3, so that it terminates flush with the edge 10 of the plug-in type socket. Owing to the countersunk end of the latch 5 the tooth of engagement remains unweakened.

If the connection is to be released again, pressure is exerted on the frame 4 of the plug-in type socket in the direction of the arrow (FIG. 1). Due to the elastic deformation then occurring which is relieving wall 7 by a round groove 15, thereby permitting movement of wall 7 away from the latch 5 to permit the tooth 3 which is in engagement with the latch 5 to be released. The free end 11 slides out of the socket unobstructedly.

Instead of the one interlocking latch 5 shown there may also be provided two oppositely disposed interlocking latches. Also the arrangement of two pairs of interlocking latches opposite each other on the four sides of the socket is imaginable. The band is correspondingly provided with respectively associated teeth.

I claim:

1. A one-piece cable band of flexible plastic material comprising a toothed band and a plug-in type socket at its one end, said socket consisting of an elastically deformable frame which is oval shape, a funnel-shaped opening having an interlocking latch projecting into said opening with said opening adapted to receive the tooth band while the interlocking latch engages teeth on said band, the longitudinal axis of said oval opening is substantially longer than the width of the tooth band so that the frame may be compressed in the direction of the longitudinal axis to unlock the tooth band, the wall forming the opening opposite the interlocking latch being relieved throughout its length and intermediate its side extremities by a groove extending substantially parallel with the axis of the opening whereby said frame can be compressed and deformed, said interlocking latch includes a hook-shaped portion integral with the side of the frame facing toward the toothed band and extending obliquely from the end of introduction towards the opposite side of the frame, said interlocking latch further including a pair of skin-like portions connecting the side edges of the interlocking latch with the support side of the frame to provide a resilient spring-like action to said latch, the free end of said latch terminating a predetermined distance from the end of the opening opposite the end of introduction, said predetermined distance being at least equal to the spacing of adjacent teeth on said band.

2. A cable band according to claim 1, characterized in that the toothed band tapers in thickness towards the free end and in this region is provided with such a tapered structure on one side thereof.

* * * * *